United States Patent [19]

Kools et al.

[11] 4,354,993
[45] Oct. 19, 1982

[54] METHOD OF MANUFACTURING A MAGNET BODY

[75] Inventors: Franciscus X. N. M. Kools; Sytse Strijbos, both of Eindhoven, Netherlands

[73] Assignee: U.S. Philips Corporation, New York, N.Y.

[21] Appl. No.: 801,029

[22] Filed: May 27, 1977

Related U.S. Application Data

[63] Continuation of Ser. No. 609,014, Aug. 29, 1975, abandoned.

[30] Foreign Application Priority Data

Sep. 17, 1974 [NL] Netherlands .......................... 7412288

[51] Int. Cl.³ .............................................. C04B 35/26
[52] U.S. Cl. ..................................... 264/86; 264/108; 264/DIG. 58
[58] Field of Search .................. 264/61, 86, DIG. 58, 264/108; 423/594; 252/519, 520

[56] References Cited

U.S. PATENT DOCUMENTS

| | | | |
|---|---|---|---|
| 2,652,360 | 9/1953 | Bond | 134/3 |
| 3,371,044 | 2/1968 | Cachardt | 264/61 |
| 3,903,228 | 9/1975 | Riedle et al. | 264/108 |

*Primary Examiner*—John A. Parrish
*Attorney, Agent, or Firm*—Marc D. Schechter

[57] ABSTRACT

A method of manufacturing a sintered permanent magnetizable body essentially consisting of a ferrite of the formula $MeO.6Fe_2O_3$, wherein Me is at least one of the metals barium, strontium and lead by adding an acid to a suspension of the powdered ferrite in a liquid which suspension is then supplied to one or more matrices of a press to form a compressed product which is then sintered. As a result of the treatment with acid, the compression time is reduced.

2 Claims, No Drawings

METHOD OF MANUFACTURING A MAGNET BODY

This is a continuation of application Ser. No. 609,014, filed Aug. 29, 1975, now abandoned.

The invention relates to a method of manufacturing a sintered permanent magnetisable body essentially consisting of a ferrite of formula $MeO.6Fe_2O_3$, where in Me is at least one of the metals barium, strontium and lead, a suspension of the powdered ferrite in a liquid being supplied to one or more matrices of a press, a compressed product being then formed while removing the liquid and the compressed product being then sintered.

Starting material in this method is powdered ferrite which essentially has the composition $MeO.6Fe_2O_3$, wherein Me is at least one of the metals barium, strontium and lead. Said powdered ferrite is obtained by prefiring a mixture of the composing oxides MeO and $Fe_2O_3$, or of compounds which upon heating are converted into said oxides. The mixture usually comprises a small excess of MeO because this has proved to have a favourable influence on the sintering properties, for which purpose certain additions may also be used. The prefired powder mixture is then ground in the presence of a liquid, usually water. Said grinding is usually carried out in a ball mill.

The properties of the sintered permanent magnetisable body also depend on the way in which this has been manufactured. For example, the remanence of the permanent magnet obtained after magnetisation is a function of the density of the sintered body, namely, the remanence is larger as the density is larger. The coercive force of the permanent magnet is a function of the particle size of the sintered body, namely, the coercive force is larger as the particle size is smaller. The particle size of the sintered body is determined in the first instance via the temperature and the duration of sintering. Therefore, it should be accurately ensured during sintering that it does not last so long and/or that it does not take place at such a high temperature that a sintered body is obtained having a particle size which results in too low a value of the coercive force.

It has been found that in the pressure filtration process, that is the part of the method in which a compressed product is formed in the press starting from the matrix filled with the suspension and while removing the liquid, two successive stages can be distinguished. First the building-up of a filter cake takes place. Then an increase of the density of the formed filter cake occurs. The average pressure rate should be chosen to be so that the pressure at the end of the first stage is still amply below the pressure which the press can provide maximally, since in fact the density of the built-up filter cake has still to be increased. If it is desired to make a more economic use of the usually expensive compression apparatus and thus to reduce the cost-price of the permanent magnetisable bodies, one is restricted to the said boundary when the compression time is reduced by an increase of the pressure of the press.

According to the invention it has now been found that it is possible to reduce the duration of the step of the building-up of the cake by a particular treatment of the suspension of the powdered ferrite. According to the invention, an acid is added to the suspension of the powdered ferrite in a liquid before this is supplied to one or more matrices of the press. All kinds of small particles dissolve, for example, small particles of the ferrite, small particles of a second phase formed during the prefiring of the mixture of the composed oxides, and small iron particles originating from the grinding apparatus.

The longer the acid treatment is used or the stronger the degree of acidity is during the treatment, the larger will be the part of the particles present in the suspension that is dissolved. Of course it is not recommendable to dissolve a large part of the ferrite because in that case only a smaller number of permanent magnetisable bodies can be manufactured. In addition it has been found that from a certain point on a further acid treatment has no further influence on the rate of the building-up of the filter cake.

When due the addition of acid up to approximately 10% by weight of solid are dissolved, good results are obtained if the suspension is rinsed with water after the acid treatment. Therefore, the suspension after the treatment with an acid is in particular brought at a pH to 2 or above 10.

When the ferrite particles become smaller as a result of the acid treatment, the coercive force of the powder increases. As already noted above, however, this is not decisive of the coercive force of a sintered magnet. In addition it has been found that an acid treatment which is so slight that the coercive force of the powder remains substantially unvaried, does produce a very favourable increase of the liquid permeability of the filter cake. The compression time, termed the building-up of the filter cake, is inwardly proportional to the liquid permeability of the filter cake.

During the manufacture of a sintered anisotropic permanent magnetisable body a magnetic field is applied during the formation of the compressed product.

EXAMPLE

A ferrite having a composition $SrO.nFe_2O_3$: wherein n is approximately 5.8, is formed by prefiring a mixture of mainly $SrCO_3$ and $Fe_2O_3$. The product comprises contamination and additions, such as $SiO_2$, up to approximately 2% by weight. Of this product a suspension is prepared by grinding in a ball mill with water until a particle size having a Fischer number of 1.59 $\mu m$.

A part of said suspension is subjected to an acid treatment with HCl, namely with 1 N, at 75° C. with a powder-liquid ratio of 0.2 kg/liter, after which samples are taken from the suspension at different times. Another part of the suspension is subjected to an acid treatment with 3 N HCl at 75° C. with a powder-liquid ratio of 0.4 kg/liter, after which samples are taken from the suspension at different times. Each sample is rinsed with water until a pH of 1 to 1.5. In this manner a number of suspensions are available which have been subjected to different acid treatments. For comparison, moreover, an untreated part of the original suspension is taken.

Of all suspensions the liquid permeability p has been measured which is deliniated according to Darcy's equation $$v = p \cdot (1/\eta) \cdot (\Delta P/L),$$

wherein v is the velocity of the liquid related to the diameter of the filtration vessel, $\eta$ is the viscosity of the liquid, $\Delta P$ the pressure drop on the particle stacking and L the height of the particle stacking. The liquid permeability p has been measured in filter cakes (diameter 40 mm, height approximately 13 mm) having a porosity of approximately 50% by volume, in which a magnetic field of 6000 Oersted has been applied at right angles to the direction of compression. The first column of the table indicates the quantity of dissolved material in percent by weight. The second column indicates the liquid permeability $p \times 10^{10}$ expressed in m². Of a number of powders the coercive force has been measured which is stated in the third column and is expressed in Oersted.

After 6.8% by weight of material has been dissolved, the coercive force of the powder is still unvaried 1560 Oersted, whereas the liquid permeability has increased from 1.30 to 1.59. It is furthermore obvious from the table that upon dissolving to approximately 10% by weight of material, a considerable improvement of the liquid permeability is already obtained; 1.5% by weight of material has dissolved after 2½ minutes of acid treatment with 1 N, while 9.8% by weight of material has dissolved after 10 minutes of acid treatment with 3 N.

TABLE

| quantity of dissolved material % by weight | $p \times 10^{10}$ m² | coercive force Oersted. |
|---|---|---|
| 0 | 1.30 | 1560 |
| 1.5 | 1.42 | |
| 2.5 | 1.45 | |
| 6.8 | 1.59 | 1560 |
| 9.8 | 1.69 | 1700 |
| 17.3 | 1.86 | 1900 |
| 24.3 | 1.86 | |

What is claimed is:

1. In a method of manufacturing a sintered permanent magnetisable body essentially consisting of a ferrite of formula $MeO.6Fe_2O_3$, wherein Me is at least one of the metals barium, strontium and lead, wherein a suspension of the powdered ferrite in an aqueous liquid is formed, the suspension being compressed while removing the liquid to form a compact product and the compact product thereafter being sintered into a coherent body, the improvement wherein an acid is added to the suspension to dissolve small particles and thereby reduce the time required to compress the suspension into a compact body.

2. A method as claimed in claim 1, wherein after the treatment with an acid the suspension is rinsed with water to bring it to a pH of about 1 to 1.5.

* * * * *

Disclaimer 4,354,993.—*Franciscus X. N. M. Kools;* and *Sytse Strijbos,* Eindhoven, Netherlands. METHOD OF MANUFACTURING A MAGNET BODY. Patent dated Oct. 19, 1982. Disclaimer filed Oct. 12, 1982, by the assignee, *U. S. Philips Corp.*

The term of this patent subsequent to Jan. 29, 1999 has been disclaimed.
[*Official Gazette December 21, 1982.*]